(12) United States Patent
Raben et al.

(10) Patent No.: US 11,746,667 B2
(45) Date of Patent: Sep. 5, 2023

(54) SEAL FOR COMBUSTION APPARATUS

(71) Applicant: Siemens Energy Global GmbH & Co. KG, Bayern (DE)

(72) Inventors: Markus Raben, Recklinghausen (DE); Kunyuan Zhou, Berlin (DE); Wojciech Dyszkiewicz, Charlotte, NC (US); Adam J. Weaver, Oviedo, FL (US); Robert H. Bartley, Oviedo, FL (US); James Bertoncello, Charlotte, NC (US); Mahmut Faruk Aksit, Istanbul (TR); Ertugrul Tolga Duran, Istanbul (TR); Erdem Gorgun, Istanbul (TR); Sadik Hazer, Istanbul (TR); Ali Ihsan Yurddas, Istanbul (TR)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 17/634,969

(22) PCT Filed: Aug. 6, 2020

(86) PCT No.: PCT/EP2020/072086
 § 371 (c)(1),
 (2) Date: Feb. 12, 2022

(87) PCT Pub. No.: WO2021/043527
 PCT Pub. Date: Mar. 11, 2021

(65) Prior Publication Data
 US 2022/0389827 A1 Dec. 8, 2022

Related U.S. Application Data

(60) Provisional application No. 62/896,008, filed on Sep. 5, 2019.

(30) Foreign Application Priority Data
 Nov. 20, 2019 (EP) ..................... 19210381

(51) Int. Cl.
 *F01D 9/02* (2006.01)
 *F01D 11/00* (2006.01)
 *F16J 15/08* (2006.01)

(52) U.S. Cl.
 CPC .............. *F01D 11/003* (2013.01); *F01D 9/02* (2013.01); *F16J 15/0887* (2013.01);
 (Continued)

(58) Field of Classification Search
 CPC ....... F01D 11/003; F01D 9/02; F16J 15/0887; F05D 2220/32; F05D 2240/12; F05D 2240/55
 See application file for complete search history.

(56) References Cited

U.S. PATENT DOCUMENTS 4,319,758 A * 3/1982 Nicholson ............ F16J 15/3204
 277/550
4,524,980 A * 6/1985 Lillibridge ............ F01D 11/005
 416/193 A (Continued)

FOREIGN PATENT DOCUMENTS

| EP | 1291493 A2 | 3/2003 |
| EP | 2559859 A1 | 2/2013 |
| WO | 2010027384 A1 | 3/2010 |

OTHER PUBLICATIONS

PCT International Search Report and Written Opinion of International Searching Authority dated Nov. 11, 2020 corresponding to PCT International Application No. PCT/EP2020/072086 filed Jun. 8, 2020.

*Primary Examiner* — David E Sosnowski
*Assistant Examiner* — Theodore C Ribadeneyra
(74) *Attorney, Agent, or Firm* — WOLTER VAN DYKE DAVIS, PLLC

(57) ABSTRACT

A seal for sealing a gap in a combustion apparatus of a gas turbine between a first side and an opposite second side. The seal includes a steel strap with a flat shape and a first metal web with a flat shape attached to the steel strap on the first side and a second metal web attached to the steel strap on the second side. Thereby the seal has a seal thickness with at least the steel strap plus the first metal web plus the thickness of the second metal web, wherein the seal thickness is at most 0.2-times of width of the seal. The new seal has an Omega shape of the second metal web, which is therefore attached on both sides with a flat shaped portion to the steel strap.

19 Claims, 3 Drawing Sheets

(52) U.S. Cl.
CPC ...... *F05D 2220/32* (2013.01); *F05D 2240/12* (2013.01); *F05D 2240/55* (2013.01)

(56) References Cited

U.S. PATENT DOCUMENTS

| | | | |
|---|---|---|---|
| 6,199,871 B1* | 3/2001 | Lampes | F16J 15/0887 277/614 |
| 6,637,751 B2* | 10/2003 | Aksit | F01D 9/041 277/653 |
| 6,926,284 B2* | 8/2005 | Hirst | F01D 25/24 277/630 |
| 7,670,108 B2* | 3/2010 | Liang | F01D 11/008 415/173.1 |
| 8,182,208 B2* | 5/2012 | Bridges, Jr. | F01D 9/041 277/630 |
| 8,240,985 B2* | 8/2012 | Martin | F01D 11/005 415/173.1 |
| 8,257,029 B2* | 9/2012 | Habarou | F01D 11/08 415/170.1 |
| 8,308,428 B2* | 11/2012 | Bridges, Jr. | F16J 15/0887 277/630 |
| 8,398,090 B2* | 3/2013 | McMahan | F01D 9/023 277/643 |
| 8,678,754 B2* | 3/2014 | Morgan | C04B 14/20 277/653 |
| 9,677,427 B2* | 6/2017 | Synnott | F01D 25/246 |
| 9,915,162 B2* | 3/2018 | Duguay | F16J 15/442 |
| 10,584,605 B2* | 3/2020 | Sippel | F01D 25/26 |
| 11,156,116 B2* | 10/2021 | Kamrath | F01D 9/041 |
| 11,187,094 B2* | 11/2021 | Feldmann | F01D 9/02 |
| 2003/0039542 A1 | 2/2003 | Cromer | |
| 2004/0051254 A1* | 3/2004 | Smed | F01D 11/005 277/628 |
| 2005/0242525 A1* | 11/2005 | Dahlke | F23R 3/002 277/605 |
| 2006/0239814 A1* | 10/2006 | Uwami | F01D 11/008 415/134 |
| 2010/0061837 A1 | 3/2010 | Zborovsky | |
| 2013/0028713 A1* | 1/2013 | Giri | F16J 15/064 415/135 |
| 2013/0042631 A1 | 2/2013 | Jadhav | |
| 2016/0053627 A1 | 2/2016 | Duguay | |
| 2017/0241280 A1* | 8/2017 | Ponchak | F01D 11/003 |
| 2017/0335704 A1* | 11/2017 | Davis | F16J 15/44 |
| 2018/0016942 A1* | 1/2018 | Sakamoto | F02B 39/00 |
| 2018/0119558 A1* | 5/2018 | Clark | F01D 25/24 |
| 2018/0135453 A1* | 5/2018 | Propheter-Hinckley | F01D 5/12 |
| 2018/0149029 A1* | 5/2018 | Vetters | F01D 11/003 |
| 2019/0017401 A1* | 1/2019 | Stoyanov | F16J 15/0887 |

\* cited by examiner

SEAL FOR COMBUSTION APPARATUS

CROSS REFERENCE TO RELATED APPLICATIONS

This application is the US National Stage of International Application No. PCT/EP2020/072086 filed 6 Aug. 2020, and claims the benefit thereof. The International Application claims the benefit of European Application No. EP19210381 filed 20 Nov. 2019 and U.S. Provisional Application No. 62/896,008 filed 5 Sep. 2019. All of the applications are incorporated by reference herein in their entirety.

FIELD OF INVENTION

The invention relates to a seal for sealing a gap between adjacent parts in high temperature applications. The advantageous application is the usage in a combustion apparatus of a gas turbine.

BACKGROUND OF INVENTION

In gas turbine engines combustion gasses with high temperature are conducted from the combustors to the expansion turbine next to the combustion apparatus. Common gas turbines comprise several can annular combustors arranged circumferentially around the rotor axis. To guide the combustion gases transition ducts are arranged between the combustors and the expansion turbine. Accordingly, the transition ducts are arranged also in an annular array, whereby at the downstream side of the transition ducts they are arranged close to each other with a gap between adjacent transition ducts. Due to tolerances and especially vibrations it is not possible to fit the transitions direct to each other without a gap. Therefore, effective sealing of the gap between adjacent transition ducts is desired.

In this application a first side represents the side of the expansion turbine relative to the gap. In the usage at a combustion apparatus the first side is a lower-pressure hot side. Accordingly, the opposite side in the direction upstream of the transition ducts is the second side. In this arrangement of a combustion apparatus the second side is a higher-pressure cold side.

One transition duct is arranged on the left side and the other transition duct is arrange on the right side relative to the gap.

From the state of the art several solutions for sealing a gap between transition ducts are known. In the common solution the transition ducts comprise at its downstream end on the opposite sides of the gap a side groove extending mainly in radial direction. The side grooves of adjacent transition ducts are arranged in principle opposite to each other in a common plane, so that a flat side seal could be arranged in both grooves while closing the gap in-between.

An exemplary known seal is built from a flat metal sheet on the second side, extending into the grooves, whereby the width of the seal is close to the distance of the opposite grounds of the grooves. Directly to the metal sheet a woven metallic mesh is attached with the same width as the metal sheet. In a further known arrangement a further second metal sheet is arranged on the opposite side of the metallic mesh.

Different to the forgoing solution there are also side seals known from the state of the art, which comprises a metal sheet as a core piece, where a woven metallic mesh is wrapped around the metal sheet. As result the side seal comprises a first layer of metallic mesh on the first side, a metal sheet as second layer and again a metallic mesh as third layer on the second side.

A further sealing is known from US 2016 0053627 A1. The consists of a bended flat metal sheet, which as on both sides along the seal a flat portion and an omega-shape between those both flat portions. This results in a high flexibility in all directions across the length of the seal. To enable a reliable mounting in grooves the omega-shaped sheet is attached on both sides to a further flat metal frame.

As the side seal is subject to wear and could limit the maintenance interval, there is always the request for a higher lifetime of the side seal.

SUMMARY OF INVENTION

The task is solved by a design of an inventive seal according the teaching of the claims. An inventive combustion apparatus is determined in the claims. Further solutions are explained in the dependent claims.

The generic seal is used for sealing a gap in high temperature application. Therefore, the generic seal is usually used in a combustion apparatus of a gas turbine. The seal extends along the path of the gap and comprises a first side and an opposite second side and further a left side and an opposite right side. In the direction from the left side to the right side, cross to the path of the gap, the seal further has a seal width. As the gap is not part of the seal itself (in this context with the definition of the seal), the gap is just used as a reference for a path respectively for a length.

The generic seal comprises as a core member a steel strap. The steel strap extends at least along the gap and from the left side to the right side essentially over the seal width. Accordingly, the steel strap has a flat shape. It is relevant for the solution, that the steel strap is essentially without any cutouts and enables essentially the sealing of the gap. "Essentially" in this context means that the steel strap is first of all fluid tight from one margin of the seal over the seal width to the opposite margin and from one end of the gap respectively seal to the opposite end of the gap respectively seal. A solution with some holes inside the steel strap to enable a reduced/controlled flow through the seal is still covered by the invention, although a solution without holes is advantageous.

On the second side of the steel strap as another layer a second metal web is applied.

The second metal web is fixed to the steel strap, whereby it is not relevant initially, which method is used to fix the layers to each other.

The generic seal is further defined by a seal thickness, which is at least the thickness of the steel strap plus the thickness of the second metal web. Due to the common arrangement of the seal in opposite grooves of the transition ducts closing a gap in-between, the seal thickness is at most 0.2-times the seal width. It is further advantageous to limit the seal thickness to 0.1-times of the seal width.

An improvement against the common side seal the inventive solution of the seal uses a modified second metal web with a modified shape. Instead of a flat shape the second metal web comprises an Omega shape with a right flat shaped portion and a left flat shaped portion and a convex arch portion between the both flat shaped portions. As result not the complete second metal web is attached to the steel strap but only the both opposite flat shape portions, whereby the convex arch portion is spaced apart from the steel strap. Therefore, a seal height in a direction from the first side to the second side is much more than the seal thickness and at least 0.3-times of the seal width and at least 3-times the seal thickness. In an embodiment the seal height is at least 0.4-times the seal width and/or at least 5-times the seal thickness.

The new inventive seal with a convex arch portion at the second side, the mounting of the seal is improved and with a more precise positioning of the seal in the gap between the both transitions also the wear of the seal could be reduced further, which results in a longer inspection interval for the seal.

In a solution, on the first side of the steel strap a further layer with a first metal web is applied. The first metal web extends essentially along the gap and essentially over the seal width from the left side to the right side. Accordingly, the first metal web has also a flat shape. The first metal web is necessary also fixed to the steel strap, whereby it is not relevant initially, which method is used to fix the three layers to each other. In this case the seal thickness is defined by at least the thickness of the steel strap plus the thickness of the first metal web plus the thickness of the second metal web.

A protection of the metal web on the left and/or right side and a reduction in the leakage flow through the gap could be reached if a right tab and a left tab are attached to both sides of the steal strap. In a first embodiment, the right tab and/or the left tab extends from the steal strap to the first side covering the respective right and/or left side of the first metal web. In a second embodiment the right tab and/or the left tab extends from the steal strap to the second side covering the respective right and/or left side of the flat shaped portions. In a third embodiment the right tab and/or the left tab extends from the first side to the second side with the attachment to the steal strap in the middle of the tab.

In a solution the convex arch portion has a certain width compared to the intentional gap. Starting from the seal width as reference the width of the convex arch portion is at least 0.15-times and at most 0.4-times of the seal width. It is particular advantageous, if the width of the arch portion is at least 0.2-times and/or at most 0.3-times the seal width.

In principle, it is possible to connect the convex arch portion with the flat shaped portions. As result a left and a right edge connects the arch portion with the flat shaped portions. But it is in particular advantageous to connect the convex arch portion with the right flat shaped portion and with the left shaped portion with a left concave bend portion and respective with a right concave bend portion. This enables a smooth curve from the right side to the left side of the second metal web.

An advantageous shape and forming of the second metal web could be reached, if the distance between the opposite flat shape portions is at least 1.5-times of the width of the arch portion. Here it is further advantageous, if the distance of the flat shape portions to each other is at most 0.7-times the seal width. This enables a good attachment of the second metal web to the steal strap and a reliable mounting of the seal at the gap. In a particular advantageous solution, the distance between the flat shaped portions is at least 2-times the width of the arch portion and/or at most 0.6-times the seal width.

With the convex arch portion and the concave bend portions on both sides there is turning line, or in view of a section cut there is a turning point between the convex and the concave portion. In a solution the turning line is about in the middle of the height of the seal. This is given, if the turning line is in the middle of the seal height or has from the middle a maximum deviation of 0.25-times of the seal height. This enables an advantageous production of the seal with the fixation of the second metal web at the steal strap and the shape is further advantageous when applied in the combustion apparatus in the gap between the adjacent transition ducts.

Regarding the extension of the second metal web along the gap different solutions are possible. With a first embodiment the second metal web extends along the gap and over the seal width from the left side to the right side. As result the steal strap is covered on the second side with the second metal web over the essentially entire size over the length of the gap.

In a second embodiment at least two portions of a second metal web are used. Here a top portion of a second metal web and a lower portion of a second metal web are applied on the steal strap on the second side, where the both portions are spaced apart from each other along the gap. Top and lower are arbitrarily chosen and are used for a location closer to the first end respectively to the opposite second of the seal spaced apart from the middle of the seal.

This solution with two spaced portions of a second metal web are in most cases fully sufficient to ensure a correct mounting and fixation of the seal at the gap. And furthermore, there could be no damage of the curved second metal web at the middle portion of the seal, as there is no curved second metal web.

Here it is further advantageous to apply at least one piece of a flat third metal web at the second side of the steal strap, where the portions of the second metal web is not located. This enables the coverage of the steal strap on the second side over the entire size at least over the length of the gap.

It has to be noted, that it is not relevant, which shape or which further features the seal comprises at its first end or at the opposite second end outside of the gap, where there is nothing to seal. As result the seal could extend beyond the gap with the steal strap and with or without one or more metal webs.

To enable a beneficial mounting of the seal at the gap it is further advantageous, if a hook portion is applied at the seal at the first or the second end. This needs to be located outside of the gap, where the hook portion should extend to the second side. The hook portion could advantageously realized as a bend portion at the steal strap or at the first metal web or in particular at a piece of the third metal web.

As the second metal web with the convex arch portion is the key feature of the invention, the solution is not limited to only one metal web on the first side. It is also possible to apply a fourth metal web on the first side. This comprises also a flat shape and is attached to the first metal web.

In this case the seal thickness is determined by the thickness of the steal strap plus the thickness of the first metal web plus the thickness of the flat shape portions plus the thickness of the fourth metal web.

Instead of a fourth metal web it is also possible to apply a further steal strap at the first side.

To fix the first metal web and the second metal web to the steal strap different solutions could be used, but in an advantageous embodiment the first metal web and the flat shaped portions are connected to the steal strap with a number of spot-welded joints. The same applies for further pieces or portions of a metal web and also for a fourth metal web, if available.

The inventive seal enables a new inventive combustion apparatus, which is advantageously of a gas turbine.

The generic combustion apparatus comprises at least a left transition duct and a right transition duct, wherein the transition ducts intentionally guide a flow of hot combustion gases from an upstream side, where combustors are arranged, to a downstream side, where an expansion turbine is arranged, if used in a gas turbine. The left transition duct comprises a left sealing groove and the right transition duct comprises a right sealing groove. The right transition duct and the left transition duct are arranged adjacent to each other with a gap in-between at the downstream end of the transition ducts. The sealing grooves are arranged opposite to each other at the gap. The gap is closed by a seal, which engages into the opposite sealing grooves.

The inventive combustion apparatus uses an inventive seal according to the forgoing description.

In a solution the distance between the grounds of the sealing grooves is at least 1.1-times and at most 1.5-times of the seal width.

It is further advantageous, if the width of the sealing grooves is at least 1.1-times of the thickness of the seal. Here it is further advantageous, if the width of the sealing grooves is at most 2-times the thickness of the seal.

Regarding the arrangement of the adjacent transition ducts to each other it is advantageous, if the width of the gap is at least 1.1-times the width of the convex arch portion. It is further advantageous, if the width of the gap is at most 1.5-times the width of the arch portion to enable a advantageous mounting of the seal in the gap. In a particular advantageous embodiment, the width of the gap is at least 1.2-times and/or at most 1.3-times the width of the convex arch portion.

BRIEF DESCRIPTION OF THE DRAWINGS

In the following figures examples for an inventive seal and its arrangement at adjacent transition ducts are shown.

DETAILED DESCRIPTION OF INVENTION

Figure 1:
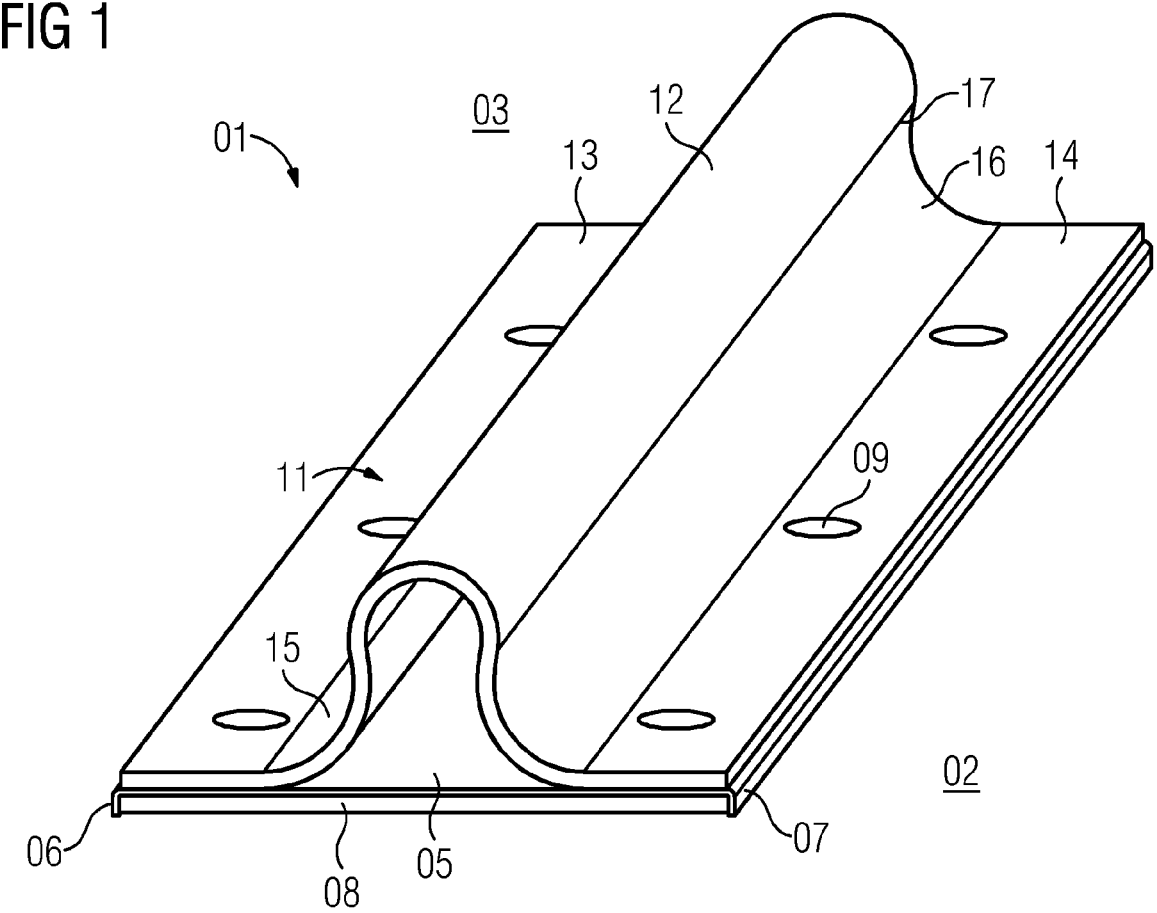
FIG. 1 shows a three-dimensional sketch of a first example.

The FIG. 1 shows in a three-dimensional sketch an example for an inventive seal 01. The seal is intentionally arranged at a gap 20, wherein the seal 01 should prevent a flow from a second side 03 to a first side 02 or vice-versa. The seal 01 extends along the gap 20 and comprises a steal strap 05 as middle layer. The steal strap 05 has a flat shape and extends from a left side to a right side of the seal 01. On the first side 02 a first metal web 08 is attached to the steal strap 05. On the right side and on the left side of the seal 01 a left tab 06 respectively a right tab 07 is attached to the steal strap 05, which both extend to the first side 02 and therefore cover the sides of the first metal web 08.

On the second side a second metal web 11 is attached to the steal strap 05. But different to the first metal web 08 the second metal web 11 comprises a convex arch portion 12 between a left flat shaped portion 13 and a right flat shaped portion 14. The flat shaped portions 13, 14 are attached directly to the steal strap 05. The left flat shaped portion 13 is connected with the convex arch portion 12 by a left concave bend portion 15 and the right flat shaped portion 14 is connected with the convex arch portion 12 by a right concave bend portion 16. The change of the bending from the concave shape of the bend portions 15, 16 to the convex shape of the arch portion 12 defines a turning line 17.

In the sketch further a number of spot-welded joints 09 are shown on the second side 03. The same spot-welded joints are applied on the first side 02 (not visible). With the spot-welded joints 09 the three layers 05, 08, 13, 14 are fixed together.

Figure 2:
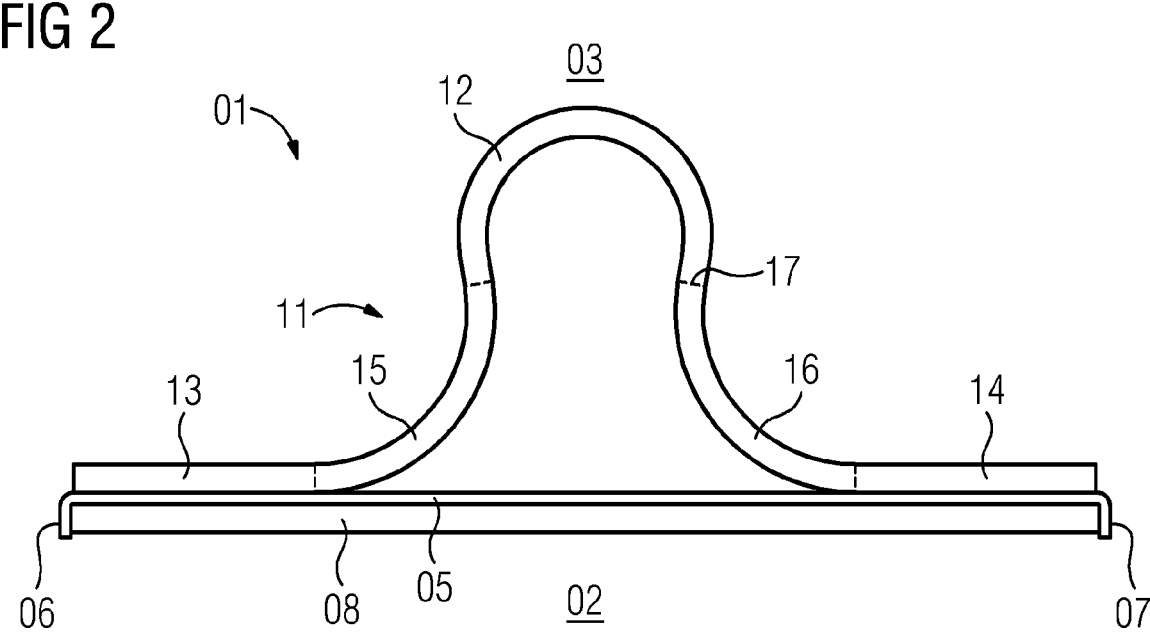
FIG. 2 shows a section cut of the seal of FIG. 1.

The FIG. 2 shows a sketch of the section cut through the seal 01 with the first side 02 of the seal 01 on the bottom side of the figure and the second side 03 of the seal 01 on the top side of the figure. The seal 01 comprises the steal strap 05 in the middle layer with the first metal web 08 on the first side 02 and the second metal web 11 on the second side 03. The second metal web 11 comprises the left flat shaped portion 13 connected to the left concave bend portion 15 connected to the convex arch portion 12 connected to the right concave bend portion 16, 36 connected to the right flat shaped portion 14. The junction from the concave bend portion 15, 16 to the convex arch portion 12 is represented by the turning line 17, in this view a turning point.

The seal 01 has a seal width from the left side to the right side. It further comprises a seal thickness with the thickness of the steal strap 05 plus the thickness of the first metal web 08 and the thickness of the flat shaped portions 13, 14. The convex arch portion 12 is spaced apart from the steal strap 05. As result the seal 01 has a height, which is in this example about 0.5-times the seal width and about 6-times the seal thickness. The turning line 17 is arranged about in the middle of the height of the seal 01. The width of the convex arch portion 12 is in this example about a quarter of the seal width. The distance of the left flat portion 13 to the right flat portion 14 is about twice the width of the convex arch portion 12 and about halve of the seal width.

Figure 3:
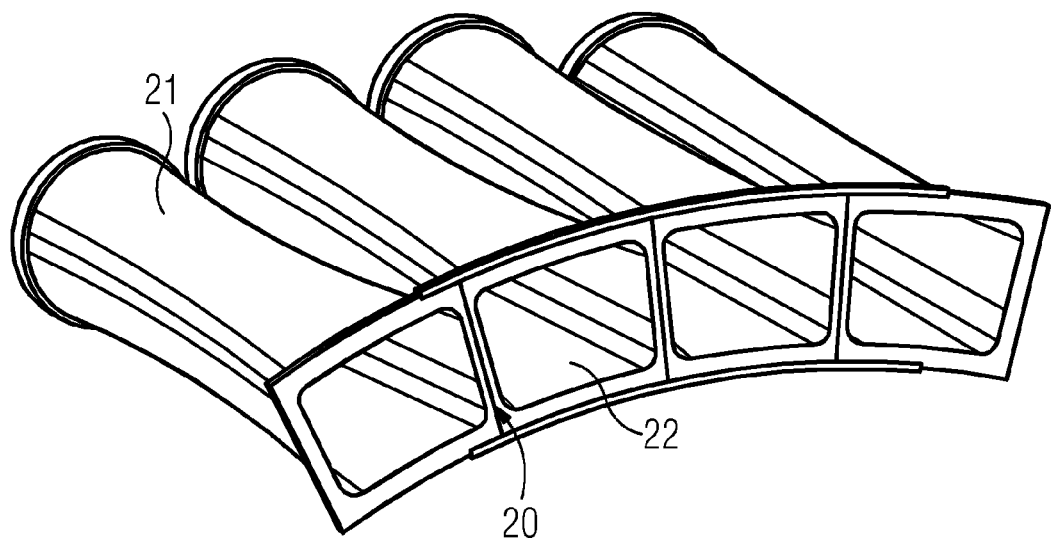
FIG. 3 shows an arrangement of transition ducts with a gap.

In the FIG. 3 an example for an arrangement of transition ducts 21 is shown. In usage at a combustion apparatus of a gas turbine further transition ducts are arranged in an annular arrangement around the rotor-axis. In the combustion apparatus on the upstream side, which is the top-left side in the FIG. 3, combustors are arranged and on the downstream side of the transition ducts 21, 22, which is the down-right side in the FIG. 3, an expansion turbine is arranged. At the downstream end of the transition ducts 21, 22 they are arranged adjacent to each other with a gap 20 in-between. The gap extends mainly in radial direction in a combustion apparatus of a gas turbine.

Figure 4:
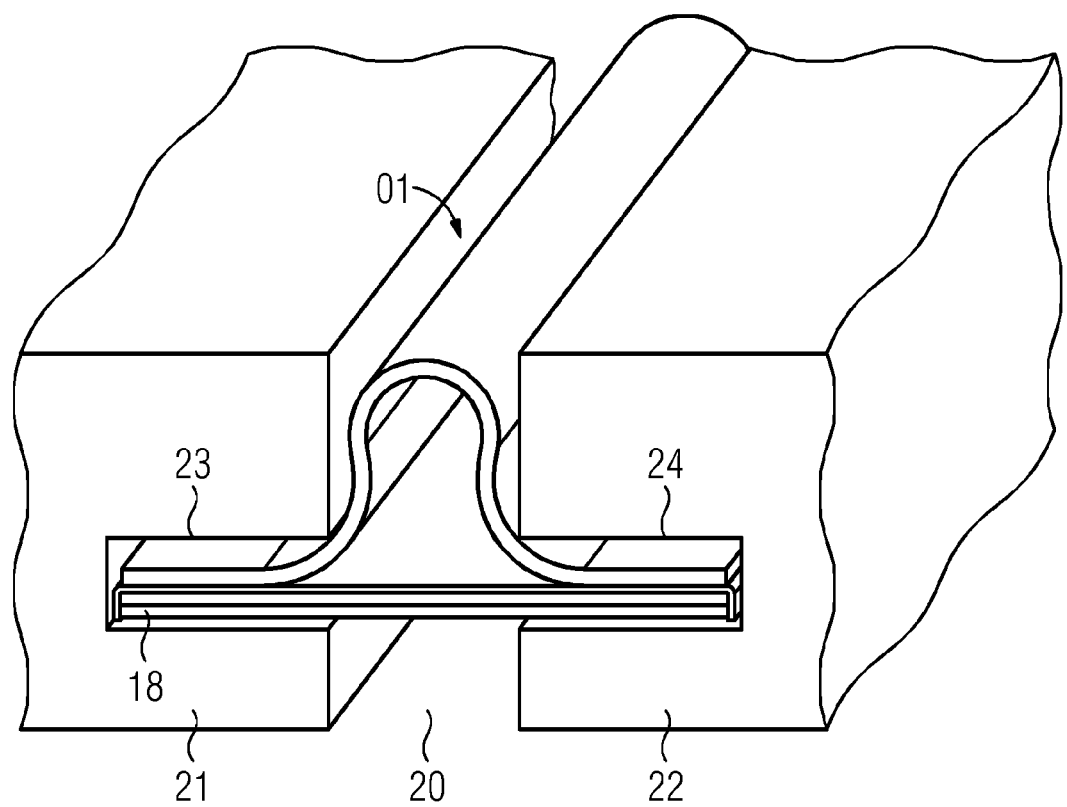
FIG. 4 shown in detail the arrangement of a second embodiment of a seal in the gap.

In the FIG. 4 a detailed view on the gap 20 between the transition ducts 21, 22 with a further example of an inventive seal 01 is shown. The transition ducts 21, 22 each comprise at the gap a sealing groove 23, 24, which are arranged opposite to each other. The seal 01 is arranged in the gap 20 engaging into the sealing grooves 23, 24. Here it is further shown, how a fourth metal web 18 could be applied on the first side 02 at the first metal web 08.

Figure 5:
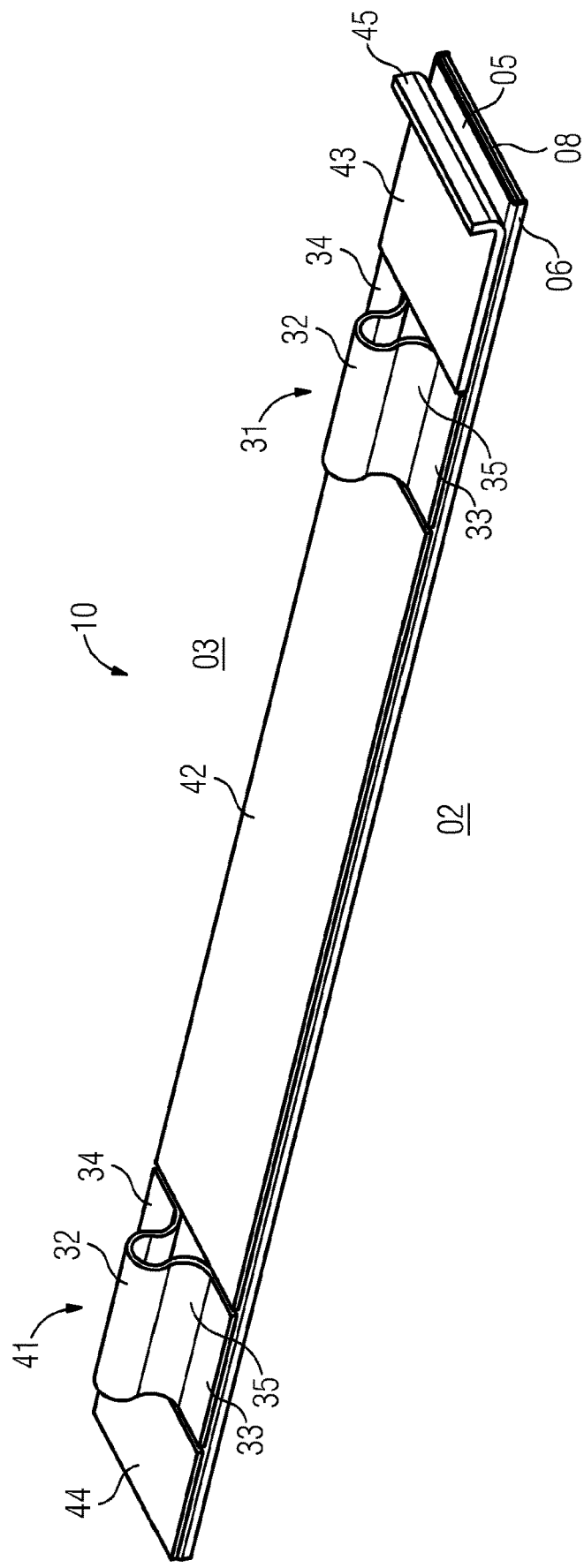
FIG. 5 shows a third embodiment of a seal with two portions of a second metal web.

In the FIG. 5 a further embodiment of a seal 10 is shown. It 10 comprises analog a steal strap 05 with an opposite left tab 06 and right tab. On the first side 02 also a first metal web 08 is arranged. Against the solution shown in the previous figures this embodiment comprises two portions of a second metal web 31, 41 instead of one piece extending over the hole length. Therefore, a top portion of a second metal web 31 is arranged close to a first end of the seal 10 on the second side and a lower portion of the second metal web 41 is arranged close to the opposite second end of the seal 10.

Both portions of the second metal web 31, 41 are design analog the second metal web 11 of the previous solution with an convex arch portion 32 in the middle extending to the second side 03 and attached a left concave bend portion 35 and a right concave bend portion followed by a left flat shaped portion 33 respectively a right flat shaped portion 34.

To ensure a beneficial sealing with the seal 10 the area beside the portions of the second metal web 31, 41 a middle piece of the third metal web 42 is applied on the steal strap 05 between the portions of the second metal web 31, 41. Furthermore a top piece of the third metal web 43 is applied at the first end of the seal 10 on the steal strap 05 on the second side 03, wherein a lower piece of the third metal web 44 is applied at the opposite second end of the seal 10. As result also in this embodiment the steal strap 05 is covered fully on the second side 03 with the portions of the second metal web 31, 41 together with the pieces of the third metal web 42, 43, 44.

To enable the beneficial mounting a hook portion 45 is applied on the first end of the seal 10, which is realized by a bend portion of the top piece of the third metal web 43.

The invention claimed is:

1. A seal for sealing intentional a gap in high temperature application, with a first side and an opposite second side, and a seal width cross to the path of the gap, comprising:
    a steel strap with a flat shape extending in an essentially closed manner over the full length and width of the seal, and
    a second metal web attached to the steel strap on the second side,
    wherein the seal has a seal thickness with at least the steel strap plus the thickness of the second metal web and has a seal height, wherein the seal thickness is at most 0.2-times of the seal width,
    wherein the second metal web comprises an Omega shape and is attached on both sides with a flat shaped portion to the steel strap and comprises a convex arch portion between both flat portions, and wherein the seal height is at least 0.3-times of the seal width and at least 3-times of the seal thickness.

2. The seal according to claim 1,
    wherein the seal thickness is at most 0.1-times of the seal width, and/or the seal height is at least 0.4 times of the seal width, and/or the seal height is at least 5 times of the seal thickness.

3. The seal according to claim 1, further comprising:
    a first metal web with a flat shape attached to the steel strap on the first side,
    wherein the seal has a seal thickness with at least the steel strap plus the first metal web plus the thickness of the second metal web.

4. The seal according to claim 3,
    wherein the steel strap is covered over the entire size at the first side at least over the length of the gap, with the first metal web.

5. The seal according to claim 3, further comprising:
    a left tab and a right tab each attached to one side of the steel strap covering the respective side of the first metal web and/or of the flat shaped portion.

6. The seal according to claim 1, wherein the width of the arch portion is at least 0.15-times and at most 0.4-times of the seal width.

7. The seal according to claim 1,
    wherein the second metal web comprises a left concave bend portion and a right concave bend portion each connecting a flat portion with the arch portion.

8. The seal according to claim 7,
    wherein the distance between the flat portions is at least 1.5-times of the width of the arch portion and at most 0.7-times of the seal width; and/or
    wherein the turning line between the bend portions and the arch portion is in the middle of the height of the seal +/−25%.

9. The seal according to claim 1,
    wherein the steel strap is covered over the entire size at the second side, at least over the length of the gap, with the second metal web.

10. The seal according to claim 1,
    wherein the second metal web consists of at least a top portion and spaced apart of a lower portion.

11. The seal according to claim 10,
    wherein the steel strap is covered over the entire size at the second side, at least over the length of the gap, with the portions of the second metal web and with further flat pieces of metal web.

12. The seal according to claim 1,
    wherein the steel strap or one of the metal webs or one of the flat pieces of metal web comprises a hook portion outside of the gap extending to the second side.

13. The seal according to claim 1,
    wherein the steel strap and the metal webs and pieces and/or portions of a metal web are connected with a number of spot-welded joints.

14. A combustion apparatus, comprising:
    at least a left transition duct and a right transition duct each for guiding a hot combustion gas,
    wherein the transition ducts are adjacent to each other with a gap in-between, each transition duct comprising a left respective right sealing groove opposite to each other, and
    a seal according to claim 1, which is arranged in the gap engaging in the sealing grooves.

15. The combustion apparatus according to claim 14,
    wherein the distance between the grounds of the sealing grooves is at least 1.1-times and at most 1.5-times the seal width.

16. The combustion apparatus according to claim 14,
    wherein the width of the sealing grooves are at least 1.1-times the thickness of the seal and at most 2-times the thickness of the seal.

17. The combustion apparatus according to claim 14,
    wherein the width of the gap is at least 1.1-times and at most 1.5-times the width of the arch portion.

18. The seal according to claim 1,
    wherein the high temperature application comprises a combustion apparatus of a gas turbine.

19. The seal according to claim 6,
    wherein the width of the arch portion is at least 0.2-times, and at most 0.3-times, of the seal width.

* * * * *